(12) United States Patent
Bots et al.

(10) Patent No.: US 7,617,527 B2
(45) Date of Patent: *Nov. 10, 2009

(54) ARCHITECTURE FOR VIRTUAL PRIVATE NETWORKS

(75) Inventors: Henk J. Bots, Hollister, CA (US); William E. Hunt, Saratoga, CA (US); Derek Palma, Union City, CA (US); John Lawler, Sunnyvale, CA (US)

(73) Assignee: Avaya Inc., Basking Ridge, NJ (US)

( * ) Notice: Subject to any disclaimer, the term of this patent is extended or adjusted under 35 U.S.C. 154(b) by 775 days.

This patent is subject to a terminal disclaimer.

(21) Appl. No.: 11/320,955

(22) Filed: Dec. 30, 2005

(65) Prior Publication Data

US 2006/0129792 A1   Jun. 15, 2006

Related U.S. Application Data

(63) Continuation of application No. 09/710,691, filed on Nov. 9, 2000, now Pat. No. 7,010,702, which is a continuation of application No. 08/874,090, filed on Jun. 12, 1997, now Pat. No. 6,226,748.

(51) Int. Cl.
  *G06F 21/00* (2006.01)
  *H04L 9/28* (2006.01)
  *H04K 1/00* (2006.01)

(52) U.S. Cl. .................. 726/15; 726/1; 713/153; 713/168; 708/203

(58) Field of Classification Search ................. None
See application file for complete search history.

(56) References Cited

U.S. PATENT DOCUMENTS

| | | |
|---|---|---|
| 4,897,874 A | 1/1990 | Lidinsky et al. |
| 4,908,528 A | 3/1990 | Huang |
| 5,239,584 A | 8/1993 | Hershey et al. |
| 5,400,334 A | 3/1995 | Hayssen |
| 5,416,842 A | 5/1995 | Aziz |
| 5,548,646 A | 8/1996 | Aziz et al. |
| 5,588,060 A | 12/1996 | Aziz |
| 5,606,668 A | 2/1997 | Shwed |

(Continued)

FOREIGN PATENT DOCUMENTS

EP   0 431 751 A   6/1991

(Continued)

OTHER PUBLICATIONS

Ryoichi Sasaki at al. (three others), Security Technologies for Open Networks, Hitachi Hyoronsha, vol. 79, No. 5, pp. 49-54 (May 1, 1997).

(Continued)

*Primary Examiner*—Christopher A Revak
(74) *Attorney, Agent, or Firm*—Muncy, Geissler, Olds & Lowe, PLLC

(57) ABSTRACT

Protocols and architecture for secure virtual private networks. Intraenterprise data communications are supported in a secure manner over the Internet or other public network space with the implementation of secure virtual private networks. Members of a virtual private network group exchange data that may be compressed, encrypted and authenticated, if the exchange is between members of the group.

30 Claims, 5 Drawing Sheets

U.S. PATENT DOCUMENTS

| | | | |
|---|---|---|---|
| 5,761,201 A | 6/1998 | Vaudreuil | |
| 5,781,550 A | 7/1998 | Templin et al. | |
| 5,805,496 A | 9/1998 | Batson et al. | |
| 5,809,281 A | 9/1998 | Steele et al. | |
| 5,818,750 A | 10/1998 | Manning | |
| 5,828,846 A | 10/1998 | Kirby et al. | |
| 5,898,784 A | 4/1999 | Kirby et al. | |
| 5,898,830 A | 4/1999 | Wesinger, Jr. et al. | |
| 5,935,245 A | 8/1999 | Sherer | |
| 6,055,575 A | 4/2000 | Paulsen et al. | |
| 6,079,020 A | 6/2000 | Liu | |
| 6,101,543 A | 8/2000 | Alden et al. | |
| 6,154,839 A | 11/2000 | Arrow et al. | |
| 6,173,399 B1 | 1/2001 | Gilbrech | |
| 6,175,917 B1 | 1/2001 | Arrow et al. | |
| 6,226,748 B1 * | 5/2001 | Bots et al. | 726/15 |
| 6,226,751 B1 | 5/2001 | Arrow et al. | |
| 6,701,437 B1 | 3/2004 | Hoke et al. | |
| 7,010,702 B1 * | 3/2006 | Bots et al. | 726/13 |
| 7,337,314 B2 * | 2/2008 | Hussain et al. | 713/151 |
| 7,360,241 B1 * | 4/2008 | Elgamal et al. | 726/11 |
| 7,421,583 B1 * | 9/2008 | Berson et al. | 713/170 |
| 7,515,711 B2 * | 4/2009 | Hayashi | 380/217 |
| 2004/0015724 A1 * | 1/2004 | Pham et al. | 713/201 |
| 2004/0088538 A1 * | 5/2004 | Isip et al. | 713/153 |
| 2004/0088574 A1 * | 5/2004 | Walter et al. | 713/201 |
| 2004/0136533 A1 * | 7/2004 | Takagaki et al. | 380/255 |
| 2006/0230266 A1 * | 10/2006 | Maes | 713/168 |
| 2007/0255941 A1 * | 11/2007 | Ellis | 713/151 |
| 2008/0056494 A1 * | 3/2008 | Jacobson et al. | 380/255 |

FOREIGN PATENT DOCUMENTS

| | | |
|---|---|---|
| EP | 04 025 355.1 | 1/2007 |
| WO | WO-95/01023 | 1/1995 |
| WO | WO-97/00471 | 1/1997 |
| WO | WO 97/00471 | 1/1997 |

OTHER PUBLICATIONS

Protection Against Wiretapping and Illegal Access, Nikkei Comunications, Nikkei Business Publications, Inc., No. 224, pp. 91-100 (Jun. 17, 1996).

"Advanced I/O Adaper Design," Jun. 1987, IBM Technical Disclosure Bulletin, vol. 30, pp. 401-402.

Pfitzmann, A. Waidner, M., "Networks without User Observablity," 1987, Computers & Security 6, pp. 158-166.

Caronni, G. Lubich, H., "Proposed Security Mechanisms in the 'New' Internet," Jan. 1996, SWITCHjournal, pp. 19-23.

* cited by examiner

ARCHITECTURE FOR VIRTUAL PRIVATE NETWORKS

This application is a Continuation of application Ser. No. 09/710,691, filed on Nov. 9, 2000, which issued as U.S. Pat. No. 7,010,702 on Mar. 7, 2006, which is a Continuation of application Ser. No. 08/874,090, filed Jun. 12, 1997, which issued as U.S. Pat. No. 6,226,748 on May 1, 2001, the entire contents of which are hereby incorporated by reference.

BACKGROUND OF THE INVENTION

1. Related Information

The present invention is related to the one described in U.S. patent application entitled "An Apparatus for Implementing Virtual Private Networks," Ser. No. 08/874,091, which issued as U.S. Pat. No. 6,173,399 on Jan. 9, 2001, assigned to the assignee of the present application and filed concurrently herewith.

2. Field of the Invention

The present invention relates to the field of data communications. More particularly, the present invention relates to techniques for implementing secure virtual private networks over public or otherwise insecure data communications infrastructures.

3. Background

In recent years organizations have come to rely heavily on the ability to transmit electronic data between members of the organization. Such data typically includes electronic mail and file sharing or file transfer. In a centralized, single site organization, these transfers of electronic data are most commonly facilitated by a local area network (LAN) installed and operated by the particular enterprise.

Preventing unauthorized access to data traversing an enterprise's LAN is relatively straightforward. This applies to both unauthorized accesses by members of the enterprise and, more importantly, to third parties on the outside. As long as intelligent network management is maintained, unauthorized accesses to data traversing an enterprises internal LAN are relatively easily avoided. It is when the enterprise spans multiple sites that security threats from the outside become a major concern.

For distributed enterprises that desire the conveniences of the above-described electronic data transfers, there are several options that exist today, but each with associated disadvantages. The first option is to interconnect the offices or various sites with dedicated, or private communications connections often referred to as leased lines. This is the traditional method organizations use to implement a wide area network (WAN). The disadvantages of implementing an enterprise owned and controlled WAN are obvious: they are expensive, cumbersome and frequently underutilized if they are established to handle the peak capacity requirements of the enterprise. The obvious advantage to this approach is that the lines are dedicated for use by the enterprise and are therefore secure, or reasonably secure, from eavesdropping or tampering by intermediate third parties.

An alternative to the use of dedicated communications lines in a wide area network is for an enterprise to handle intersite data distributions over the emerging public network space. Over recent years, the Internet has transitioned from being primarily a tool for scientists and academics to a mechanism for global communications with broad ranging business implications. The Internet provides electronic communications paths between millions of computers by interconnecting the various networks upon which those computers reside. It has become commonplace, even routine, for enterprises, even those in nontechnical fields, to provide Internet access to at least some portion of the computers within the enterprise. For many businesses this facilitates communications with customers, potential business partners as well as the distributed members of the organization.

Distributed enterprises have found that the Internet is a convenient tool to provide electronic communications between members of the enterprise. For example, two remote sites within the enterprise may each connect to the Internet through a local Internet Service Provider (ISP). This enables the various members of the enterprise to communicate with other sites on the Internet including those within their own organization. The limiting disadvantage of using the Internet for intra-enterprise communications is that the Internet is a public network space. The route by which data communication travel from point to point can vary on a per packet basis, and is essentially indeterminate. Further, the data protocols for transmitting information over the various networks of the Internet are widely known, and leave electronic communications susceptible to interception and eavesdropping with packets being replicated at most intermediate hops. An even greater concern arises when it is realized that communications can be modified in transit or even initiated by impostors. With these disconcerting risks, most enterprises are unwilling to subject their proprietary and confidential internal communications to the exposure of the public network space. For many organizations it is common today to not only have Internet access provided at each site, but also to maintain the existing dedicated communications paths for internal enterprise communications, with all of the attendant disadvantages described above.

While various encryption and other protection mechanisms have been developed for data communications, none completely and adequately addresses the concerns raised for allowing an enterprise to truly rely on the public network space for secure intra-enterprise data communications. It would be desirable, and is therefore an object of the present invention to provide such mechanisms which would allow the distributed enterprise to rely solely on the public network space for intra-enterprise communications without concern for security risks that presently exist.

SUMMARY OF THE INVENTION

From the foregoing it can be seen that it would be desirable and advantageous to develop protocols and architecture to allow a single organization or enterprise to rely on the public network space for secure intraorganizational electronic data communications. The present invention is thus directed toward the protocols and architecture for implementing secure virtual private networks over the Internet or other public network systems. The architecture of the present invention introduces a site protector or virtual private network (VPN) unit which moderates data communications between members of a defined VPN group. In accordance with one embodiment of the present invention, the site protector resides on the WAN side of the site's router or routing apparatus which is used to connect the enterprise site to the Internet. In alternative embodiments, the site protector will reside on the LAN side of the router. The essential point for all embodiments is that the site protector be in the path of all relevant data traffic.

To ensure secure data communications between members of the same VPN group, the site protector or VPN unit implements a combination of techniques for data packet handling when packets are to be sent between members of the group. The packet handling processes include various combinations of compression, encryption and authentication, the rules for each of which may vary for members of different groups. For each group defined as a virtual private network, the various parameters defining the compression, encryption and authentication are maintained in lookup tables in the associated VPN units. The lookup tables maintain information not only for fixed address members of the group but support is also provided for remote clients. This ability allows remote users to dial into a local Internet Service Provider and still maintain membership in a virtual private network group for secure communications over the Internet with other members of the group. In the case of a remote client, the site protector may, in one embodiment, be simulated by software running on the remote client.

In other aspects of the present invention, the VPN units or site protectors may be dynamically configured to add or subtract members from the virtual private network group or recognize their movement, or change other parameters affecting the group. Various other packet handling aspects of the invention include addressing the problem of some data packets growing too large by the inclusion of encryption and authentication information. Another packet handling aspect provides a mechanism for Internet communications which hides information identifying the source and destination of the data packet. In this aspect of the present invention, the VPN units are treated as the source and destination for the Internet communication data packets with the VPN units encapsulating the source and destination addresses of the endstations.

BRIEF DESCRIPTION OF THE DRAWINGS

The objects, features and advantages of the present invention will be apparent from the following detailed description, in which.

DETAILED DESCRIPTION OF THE INVENTION

Protocols and an architecture are disclosed for implementing secure virtual private networks for enterprise communications over the Internet or other public network space. Although the present invention is described predominantly in terms of utilizing the Internet as a communications medium, the concepts and methods are broad enough to accomplish the implementation of secure virtual private networks over other public or insecure communications media. Throughout this detailed description, numerous specific details are set forth such as particular encryption or key management protocols, in order to provide a thorough understanding of the present invention. To one skilled in the art, however, it will be understood that the present invention may be practiced without such specific details. In other instances, well-known control structures and system components have not been shown in detail in order not to obscure the present invention.

In many instances, components implemented by the present invention are described at an architectural, functional level. Many of the elements may be configured using well-known structures, particularly those designated as relating to various compression or encryption techniques. Additionally, for logic to be included within the system of the present invention, functionality and flow diagrams are described in such a manner that those of ordinary skill in the art will be able to implement the particular methods without undue experimentation. It should also be understood that the techniques of the present invention may be implemented using a variety of technologies. For example, the virtual private network unit or site protector to be described further herein may be implemented in software running on a computer system, or implemented in hardware utilizing either a combination of microprocessors or other specially designed application specific integrated circuits, programmable logic devices, or various combinations thereof. It will be understood by those skilled in the art that the present invention is not limited to any one particular implementation technique and those of ordinary skill in the art, once the functionality to be carried out by such components is described, will be able to implement the invention with various technologies without undue experimentation.

Figure 1:
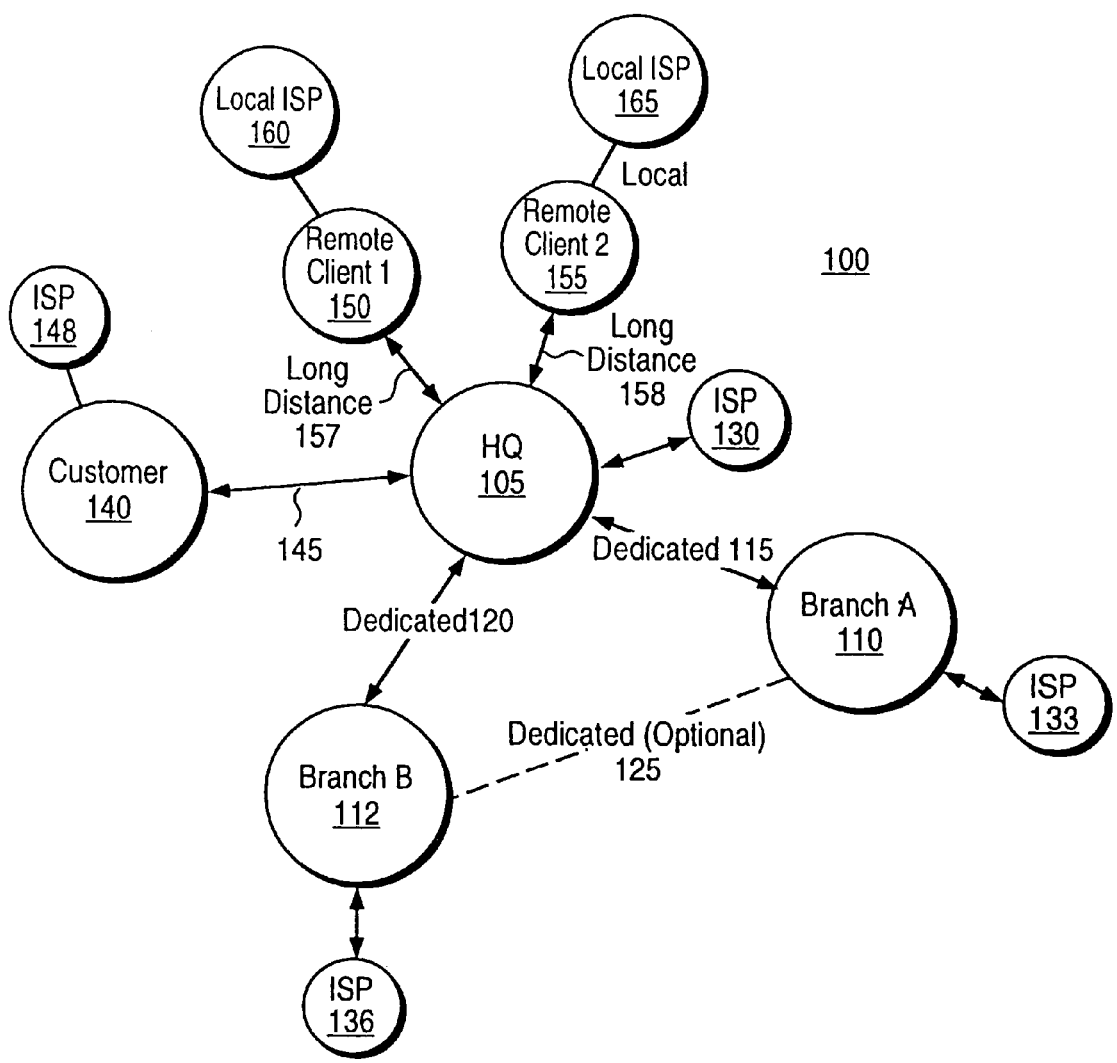
FIG. 1 illustrates a prior art configuration for an exemplary enterprise's intraenterprise communication architecture.

Referring now to FIG. 1 there is shown a traditional scenario for intra-enterprise data communications for a distributed organization. In this illustration of an exemplary organization configuration, the enterprise consists of a headquarters location 105 with additional sites or branches 110 and 112, respectively. In modern organizations, such as the exemplary one of FIG. 1, the headquarters' site 105 as well as the branch sites 110 and 112 may each comprise numerous personnel, many of whom are provided with computers or work stations with network access. The internal network configurations at the headquarters for branches may take many forms including one or several local area networks (LANs). For intersite communications between headquarters and the branches, dedicated or leased communications lines 115 and 120 may be provided. In addition, an optional dedicated communications path 125 may be provided between the branches 110 and 112. As an alternative to the optional dedicated communications line 125 between the branches, data packets between branch 110 and branch 112 may be routed through the headquarters' network equipment.

In addition to the dedicated communications lines between the headquarters and the various branches, it is common today to provide computer users within an organization access to the Internet for electronic mail to external parties as well as for doing various types of research over the Internet using such tools as the World Wide Web, etc. As shown in FIG. 1, the usual scenario where the headquarters' site 105 and the branches 110 and 112 are each separately provided with direct access to Internet Service Providers 130, 133 and 136, respectively. This facilities the users at the various sites with their access to the Internet for the above purposes. In an alternate configuration, it may be that only the headquarters site 105 is provided with access to an Internet service provider 130 and that users of the computers of the branch sites 110 and 112 will connect to the Internet through headquarters via their dedicated communications paths 115 and 120. The downside to this alternate configuration is that it greatly increases the bandwidth utilization on the dedicated lines, perhaps to the point of saturation. An advantage is that only one gateway to the Internet need be provided for the organization which simplifies enforcing security constraints on connections to the outside world.

In the exemplary organization 100, it is also shown that in some circumstances it may be desirable to allow customers or other business partners to dial in directly to the computer network of the organization. In FIG. 1 it is illustrated that the customer 140 may in fact carry out such communications over a communications path 145 which may be a dedicated line provided between the customer and the organization for the customer's convenience. The path 145 may also be a dial-up line which the customer might use only sporadically. Consistent with the emerging use of the Internet and its popularity, the customer 140 is shown having its own Internet connection through ISP 148.

Finally, there is shown in FIG. 1 that it is frequently desirable for other members of the enterprise who may be on the road or working from home or other remote locations to exchange data with other members of the enterprise. There is thus shown remote clients 150 and 155 communicating with the headquarters over long distance telephone lines 157 and 158. This example assumes that the remote clients are in a truly remote location from the headquarters. The remote clients 150 and 155 are also respectively shown having local access to the Internet through local ISPs 160 and 165.

Figure 2:
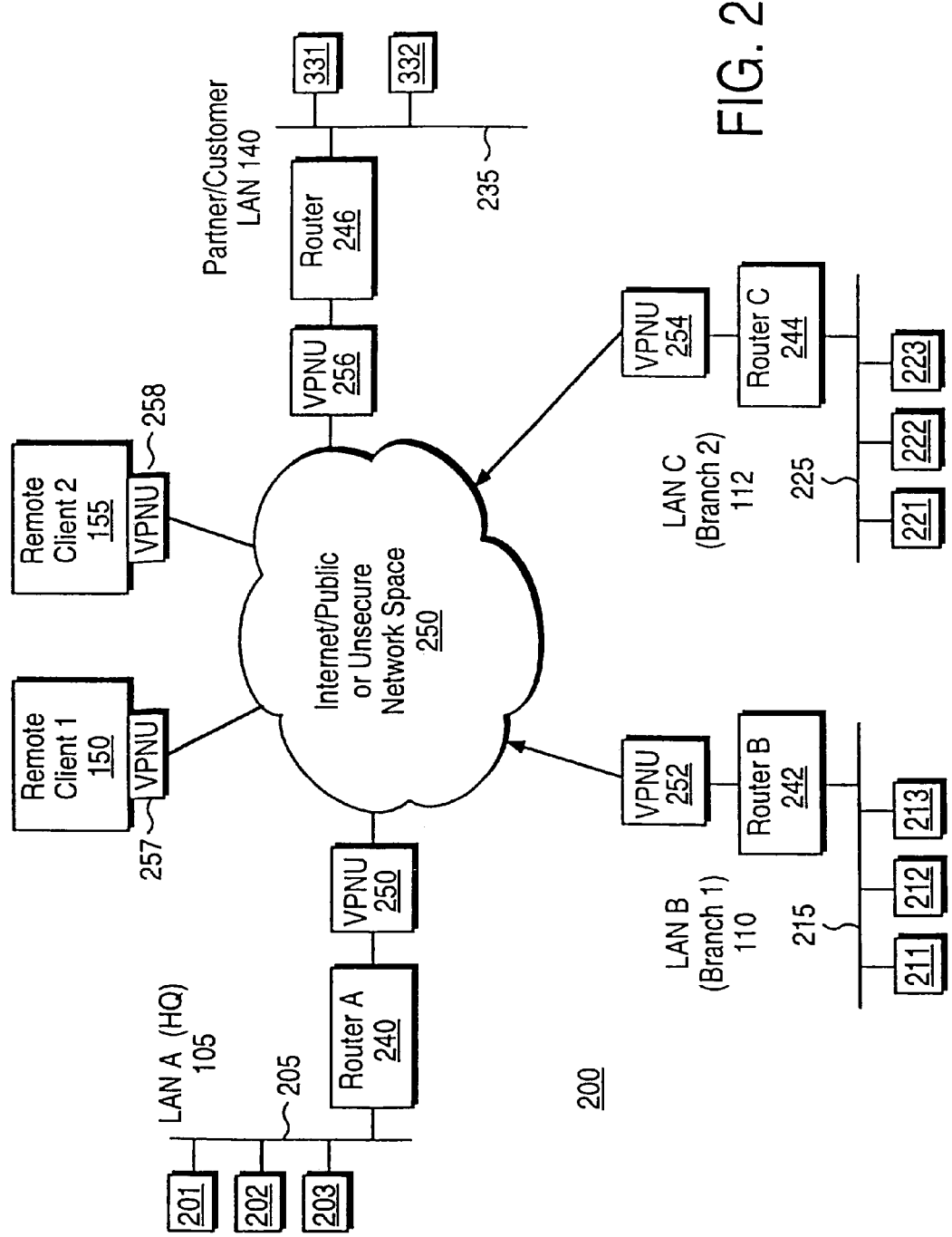
FIG. 2 illustrates an enterprise communication scenario in accordance with the present invention utilizing the Internet or other public network space as the vehicle for conveying messages between members of a virtual private network.

The above description of an enterprises data communications configuration according to FIG. 1 illustrates the disadvantages described in the previous section. These disadvantages are eliminated by implementation of the present invention as illustrated generally with reference to FIG. 2. In the enterprise network communication configuration 200 illustrated in FIG. 2, the headquarters 105, first branch 110 and second branch 112 of the organization are illustrated in a more detailed logical way then presented in FIG. 1. Thus, the headquarters 105 is illustrated with three endstations 201, 202 and 203, respectively coupled to communicate data packets over local area network (LAN) 205. Likewise, the branch site 110 is shown having a plurality of endstations 211, 212 and 213 respectively coupled to communicate data locally over LAN 215. Finally, the second branch site 112 is shown with an illustrative set of computer stations 221, 222 and 223 connected to communicate over LAN 225. The customer site 140 is also illustrated in FIG. 2 as comprising of plurality of computers illustrated by 331 and 332 coupled to communicate over the customer's LAN 235. The local area networks utilized for data communications within the headquarters, customer and branch sites may adhere to a wide variety of network protocols, the most common of which are Ethernet and Token Ring.

As can be seen in FIG. 2, the dedicated communications lines between the headquarters site 105 and the branch sites 110 and 112 as well as between the headquarters site 105 and the customers site 140 have been eliminated. Instead, in accordance with the present invention data communications between members of the organization are intended to be carried out over the Internet or other public network space. For purposes of the present invention, it will be assumed that it is the widely emerging Internet that will be the medium for data packet transfers between members of the organization.

Each of the LANs for the particular sites illustrated in FIG. 2 ultimately interconnect to the Internet 250 through an associated routing or gateway device which are identified as routers 240, 242, 244 and 246, respectively. It is to be understood that data packets conveyed between a various sites illustrated in 200 would traverse, in many cases, a plurality of additional routing devices on their way between the source and destination sites for the packets. The mechanisms for data packet transfers over the Internet are well known and are not described in great detail herein. It is understood that data packets are assembled in accordance with the Internet Protocol (IP) and are referred to herein as IP packets regardless of the version of the Internet protocol presently in effect. In the case of the remote clients 150 and 155 illustrated in FIG. 2 it is understood that they utilize communication software to dial up a local Internet service provider which itself provides the gateways necessary for communications over the Internet 250.

As has been described above, prior efforts to utilize the Internet for secure data communications have required an awareness or implementation of security considerations at the endstations. This is disadvantageous when transparency to an end user is desirable. The present invention, on the other hand is transparent to end users with data communications over the Internet occurring exactly as they appear to have before. However, for users identified as members of the same virtual private network, data communications are handled in a manner that assures the security and integrity of the data packets. Illustrated in FIG. 2, between the Internet 250 and each of the respective routers 240, 242, 244 and 246, are Virtual Private Network Units (VPNUs) 250, 252, 254 and 256. In accordance with the particular illustrated embodiment of the present invention, the VPNUs reside between a site's router and the path to the Internet. It should be understood that this placement of VPN units in the overall system architecture represents only one placement choice. It will be clear from the materials that follow that the key point with respect to VPNU placement is that they reside in the path of data traffic. In many embodiments, it may in fact prove desirable to situate the VPNU on the LAN side of a site's router. As will be described in more detail below, the VPN units maintain lookup tables for identifying members of specific virtual private network groups.

When a data packet is sent between source and destination addresses that are both members of the same VPN group, the VPNU will process the data packet from the sending side in such a way as to ensure that it encrypted, authenticated and optionally compressed. Likewise, the VPNU servicing the site where the destination address is located will detect that a packet is being propagated between members of the same VPN group. The receiving VPNU will handle the process of decrypting and authenticating the packet before forwarding it toward the destination endstation. In this way, secure data communications between end users is effected in a manner that is transparent to the end users. In the case of remote clients 150 and 155, the VPNU may be simulated in software which operates in conjunction with the communication software for connecting the remote client to the associated local Internet service provider.

Figure 3:
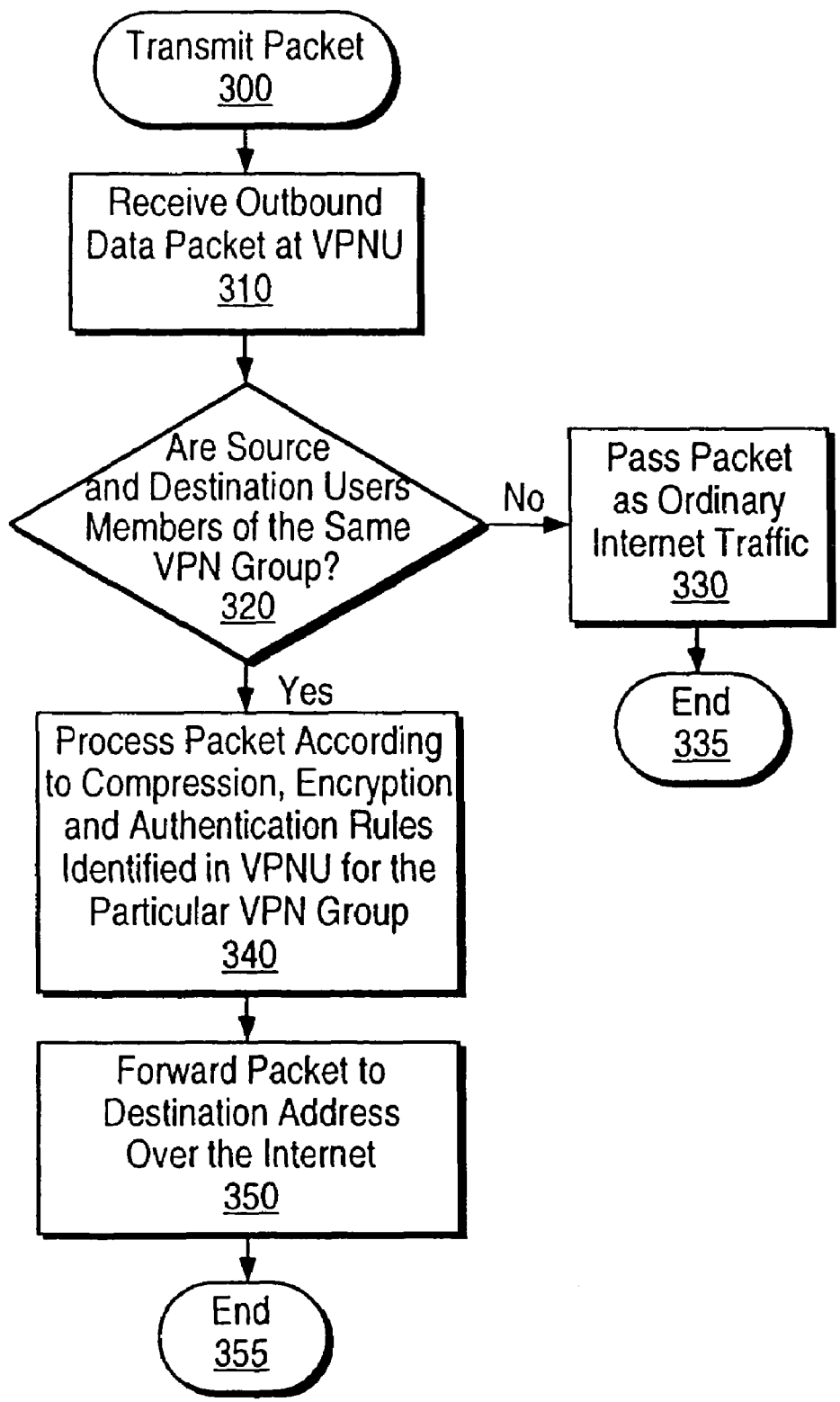
FIG. 3 illustrates a flow diagram for the handling of a packet being transmitted from one member of a virtual private network group to another member over the Internet.

The functionality of the VPN units will be described with reference to the following figures beginning with the flowchart of FIG. 3. When a data packet originates from an endstation, such as endstation 202 of LAN 205 at site 105, and its destination is to a remote site, other than the headquarters site 105, it will initially be treated as an ordinary Internet data packet transfer. The packet will proceed from the endstation 202 over the LAN 205 to the routing device 240 which will encapsulate the data packet in accordance with the Internet Protocol, forming an outbound IP packet. On its way out of the site, the IP packet will pass through the associated VPN unit for the site. The flowchart illustrated at FIG. 3 shows the functional operation of a VPN unit for an outbound packet that is received thereby. The Transmit Packet procedure 300 begins when the outbound data packet is received at the VPNU at step 310. At decision box 320, it is determined whether or not the source and destination addresses for the data packet are both members of the same VPN group. This determination may be made with reference to lookup tables that are maintained by the VPN units or reference to other memory mechanisms. This step may be thought of as member filtering for data packets being transmitted between the particular site and the VPN unit which services it. If the source and destination address for the data packet are not both members of the same VPN group, then at step 330 the packet is forwarded to the Internet as ordinary Internet traffic from the site as though the VPNU were not involved. In which case, the procedure ends at step 335. In one alternative embodiment, it may be desirable to discard data traffic that is not destined between members of a VPN group rather than forwarding it as unsecure traffic. In another alternative embodiment, it may be desirable to provide the option to either pass or discard non-VPN-group data traffic.

If, at decision box 320, the member filter, it is determined that both the source and destination addresses for the data packet are members of the same VPN group, then the data packet is processed at step 340 undergoing various combinations of compression, encryption and authentication. The lookup tables maintained by the VPN unit 250 and all of the VPN units, in addition to identifying members of particular VPN groups, also identify whether or not data packets transferred between members of the particular VPN group are to be compressed and if so, what algorithm is to be used for compression. Many possible compression algorithms are well-known, but in one embodiment of the invention, LZW compression is implemented. The lookup table for the VPN group of which the source and destination addresses are members also identifies the particular encryption algorithm to be used for data packets traversing the Internet for that VPN group as well as the authentication and key management protocol information to be used thereby. As an alternative to lookup tables, the VPNU may be programmed to always use the same algorithms for all VPN groups.

The particular packet processing algorithms to be used for VPN traffic may vary, so long as the lookup tables in both the sending and receiving VPN units identify the same compression, encryption and authentication rules and are capable of implementing and deimplementing them for members of the same group. It is to be understood that a single VPNU may serve multiple VPN groups and that particular addresses may be members of multiple groups. Thus, at step 340, when a packet is destined from one member of the VPN group to another, the packet is processed according to the compression, encryption and authentication rules identified in the VPNU tables for that particular VPN group. Then, at step 350, the processed packet is forwarded toward the destination address over the Internet. The procedure of the sending VPN unit then ends at step 355.

Figure 4:
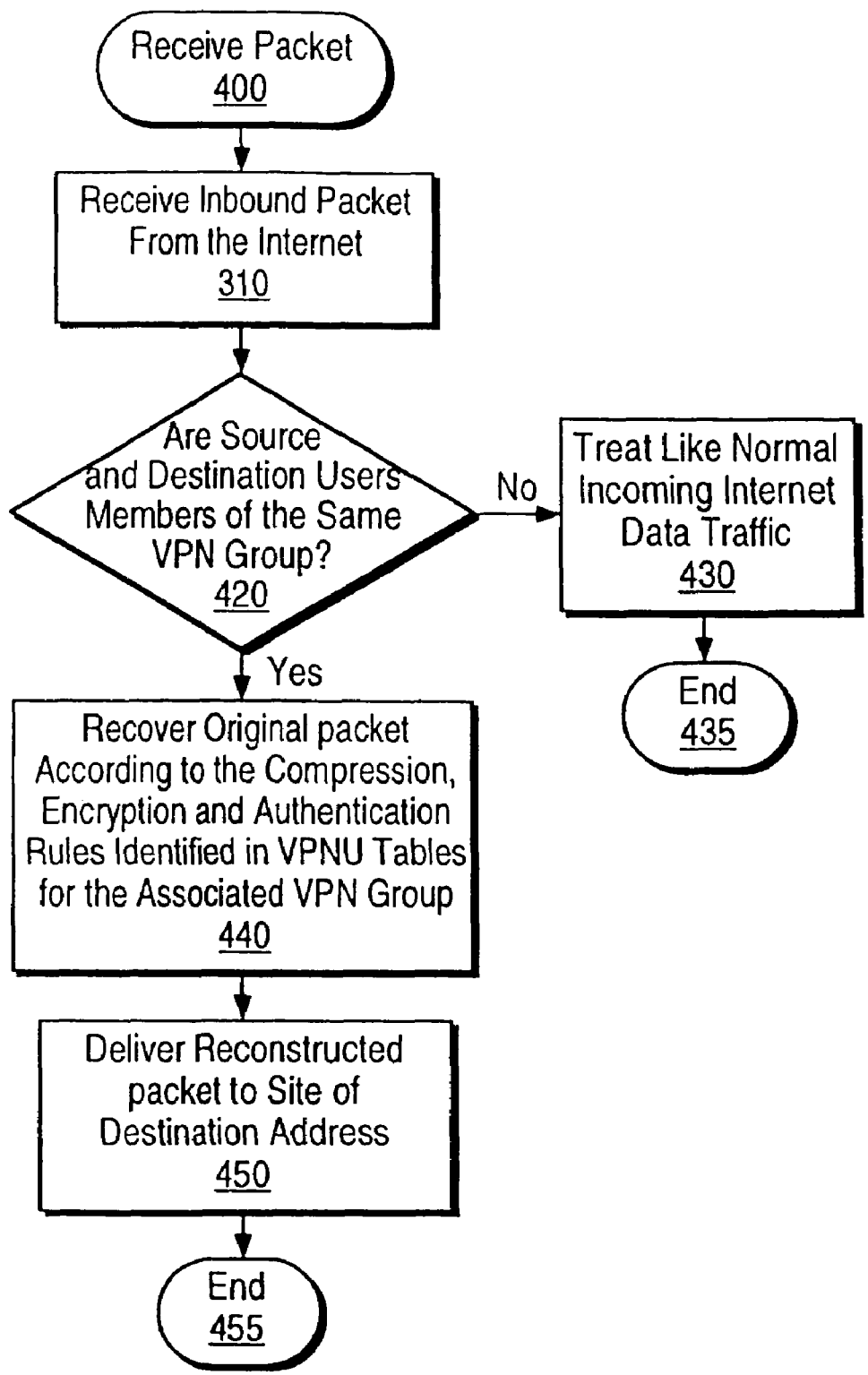
FIG. 4 illustrates the handling of a data packet received over the Internet by one member of a virtual private network group from another member.

The receiving VPNU reverses the above processes for VPN traffic as illustrated by the flowchart of FIG. 4. The Receive Packet procedure 400 begins at step 410 when an inbound data packet is received from the Internet at the receiving VPN unit. At decision box 420, the inbound data packet is examined to determine if the source and destination addresses of the data packet are both members of the same VPN group. It is assumed that the lookup tables maintained by all of the VPN units are both consistent and coherent. If the inbound data packet is determined not to be VPN traffic, then the packet is passed through and forwarded to the receiving site as though it were normal Internet data traffic at step 430. In which case the process ends at step 435. In one alternative embodiment, it may be desirable to discard incoming data traffic that is not from an identified member of a VPN group supported by the VPNU.

For data packets that are determined to be VPN traffic at decision box 420, the VPN unit will process the inbound packet to recover the original data packet as it was provided from the source endstation. The lookup table maintained by the receiving VPN unit will identify the compression, encryption and authentication rules used for the VPN group and reconstruct the original IP packet in accordance with those rules at step 440. Then, the reconstructed packet will be delivered to the site of the destination address at 450 with the procedure ending at step 455.

Figure 5:
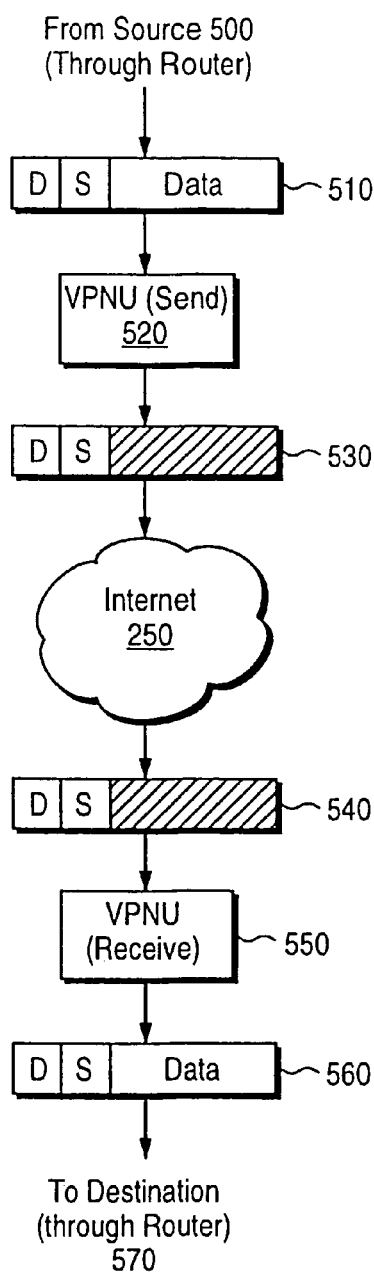
FIG. 5 illustrates graphically the life cycle of a data packet being sent from one member of a virtual private network group to another over the Internet.

FIG. 5 illustrates graphically the life cycle of the data packet sent between two members of the same VPN group. The data packet originates from a source 500 and propagates from the sources site through its associated router to generate IP data packet 510. The data packet 510 is not intended to illustrate all the fields associated with a complete IP data packet, but shows the relevant portions for this discussion which include the destination address, source address and the payload information of the packet. The data packet 510 is then examined by the VPN unit which determines whether the data packet is traffic between members of an identified VPN group. The VPN unit 520 processes the packet in accordance with the packet processing procedures described above with respect to FIG. 3 with the resulting packet being illustrated as packet 530. Packet 530 still identifies the destination and source addresses of the data packet, but the remainder of the packet is encrypted, and optionally compressed.

Following processing by the outbound VPNU, the data packet is propagated through the Internet to 550 with the destination and source information identifying to the associated routers of the Internet the path by which the packet should ultimately take to reach its destination. The packet emerges from the Internet at the edge of the destination site as data packet 540 which is essentially identical to the data packet 530. The packet is "deprocessed" by the receiving VPN unit 550 which restores the original packet into its form 560 for delivery to the ultimate destination through the receiving site's associated router at destination 570.

As was described above, the present invention approach to virtual private networks supports not only optional compression of data packets, but encryption and authentication techniques as well. One emerging standard for key management in connection with Internet Protocol data transfers with authentication is referred to as simple key management for Internet Protocol (SKIP) which is described by U.S. Pat. No. 5,588,060 assigned to Sun Microsystems, Inc. of Mountain View, Calif. Authenticated data transfers using SKIP support a mode of data transfer referred to as tunnel mode. The above described data transfer with respect to FIG. 5 illustrates a transport mode of operation in which the data and source addresses are exposed as the data packet traverses the Internet. In tunnel mode, an added measure of security may be provided by encapsulating the entire data packet in another packet which identifies the source and destination addresses only for the VPN units. This conceals the ultimate source and destination addresses in transit.

Figure 6:
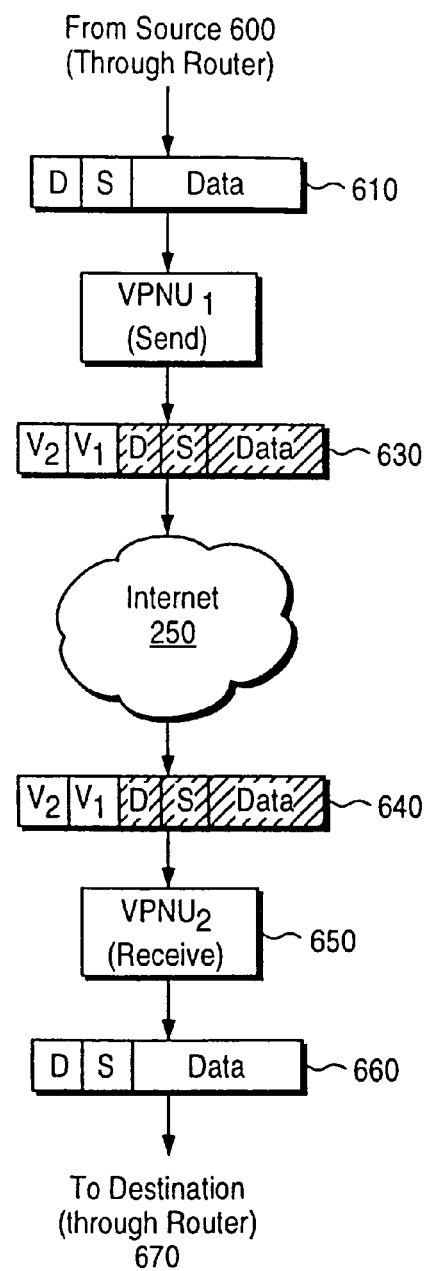
FIG. 6 illustrates an alternate life cycle of a data packet being sent from one member of a virtual private network group to another over the Internet where the source and destination addresses of the group members are also concealed.

FIG. 6 illustrates the life cycle of a data packet being propagated from a source 600 to a destination 670 utilizing tunnel mode. In this mode of operation, the data packet 610 is processed by outbound VPNU 620 which generates a resulting packet 630. The resulting packet 630 encrypts and compresses (optionally) not only the data payload of the packet, but the destination and source addresses of the endstations as well. The encapsulated packet is then provided with an additional header that identifies that the source of the packet is the outbound VPNU 620 and that the destination is the inbound VPNU 650. Thus, the packet 640 which emerges from the Internet is identical to the packet 630 with respect to its source and address information and encapsulated payload. The packet is decomposed by the inbound VPNU 650 to reconstruct the original data packet at 660 for delivery to the destination 670.

The overall architecture of the present invention is robust. It allows end users the convenience of proprietary data communications to take place over a public network space such as the Internet. The architecture of the present invention also allows a wide variety of compression, encryption and authentication technologies to be implemented, so long as the VPN units at each end of the transaction support the associated protocols. The present invention is also capable of working in concert with traditional Internet security mechanisms such as corporate firewalls. A firewall might operate in series with the VPN unit at a given site, or, intelligently be configured in a single box with the VPN unit to provide parallel firewall and VPN unit security functions.

There has thus been described a protocol and architecture for implementing virtual private networks for using a public network space for secure private network data communications. Although the present invention has been described with respect to certain exemplary and implemented embodiments, it should be understood that those of ordinary skill in the art will readily appreciate various alternatives to the present invention. Accordingly, the spirit and scope of the present invention should be measured by the terms of the claims which follow.

The invention claimed is:

1. A method for sending a data packet from a source in a local area network (LAN) to a destination outside the LAN comprising the steps of:
   receiving a data packet enroute from the source in the LAN to the destination;
   determining if the source in the LAN and the destination are members of a virtual private network, and if so:
      determining an encryption algorithm for messages sent between members of the virtual private network by accessing a portion of a memory that maintains information identifying various encryption algorithms to be utilized for data packets sent between members of various virtual private networks;
      determining a compression algorithm for messages sent between members of the virtual private network by accessing a portion of the memory that maintains information identifying various compression algorithms to be utilized for data packets sent between members of the various virtual private networks;
      executing the determined encryption algorithm on at least a payload portion of the data packet;
      executing the determined compression algorithm on at least the payload portion of the data packet; and
      forwarding the encrypted and compressed data packet to the destination outside the LAN.

2. The method according to claim 1, wherein the compression algorithm is executed on at least the payload portion of the data packet before the encryption algorithm is executed on at least the payload portion of the data packet.

3. The method according to claim 1, wherein if it is determined that the data packet is not being sent between members of the virtual private network, the data packet is not sent.

4. The method according to claim 1, wherein if it is determined that the data packet is not being sent between members of the virtual private network, the data packet is not encrypted.

5. The method according to claim 4, wherein if it is determined that the data packet is not being sent between members of the virtual private network, the data packet is not compressed.

6. The method according to claim 1, wherein if it is determined that the data packet is not being sent between members of the virtual private network, the data packet is not compressed.

7. The method according to claim 1, wherein said receiving step occurs within a virtual private network unit incorporated into a firewall device.

8. The method according to claim 1, wherein said step of determining if the data packet is being sent between members of the virtual private network includes comparing at least a destination address of the data packet to a list of stored destination addresses.

9. A method for sending a data packet from a source in a local area network (LAN) to a destination outside the LAN comprising the steps of:
   receiving a data packet enroute from the source in the LAN to the destination;
   determining if the source in the LAN and the destination are members of a virtual private network, and if so:
      determining an authentication algorithm for messages sent between members of the virtual private network by accessing a portion of a memory that maintains information identifying various authentication algorithms to be utilized for data packets sent between members of various virtual private networks;
      determining a compression algorithm for messages sent between members of the virtual private network by accessing a portion of the memory that maintains information identifying various compression algorithms to be utilized for data packets sent between members of the various virtual private networks;
      executing the determined authentication algorithm on the data packet;
      executing the determined compression algorithm on at least the payload portion of the data packet; and
      forwarding the authenticated and compressed data packet to the destination outside the LAN.

10. The method according to claim 9, wherein the compression algorithm is executed on at least the payload portion of the data packet before the authentication algorithm is executed on the data packet.

11. The method according to claim 9, wherein if it is determined that the data packet is not being sent between members of the virtual private network, the data packet is not sent.

12. The method according to claim 9, wherein if it is determined that the data packet is not being sent between members of the virtual private network, the data packet is not authenticated.

13. The method according to claim 12, wherein if it is determined that the data packet is not being sent between members of the virtual private network, the data packet is not compressed.

14. The method according to claim 9, wherein if it is determined that the data packet is not being sent between members of the virtual private network, the data packet is not compressed.

15. The method according to claim 9, wherein said receiving step occurs within a virtual private network unit incorporated into a firewall device.

16. The method according to claim 9, wherein said step of determining if the data packet is being sent between members of the virtual private network includes comparing at least a destination address of the data packet to a list of stored destination addresses.

17. A virtual private network unit for sending a data packet from a source in a local area network (LAN) to a destination outside the LAN comprising:
- an input for receiving a data packet enroute from the source in the LAN to the destination;
- circuitry and software for determining if the source in the LAN and the destination are members of a virtual private network, and if so for:
  - determining an encryption algorithm for messages sent between members of the virtual private network by accessing a portion of a memory that maintains information identifying various encryption algorithms to be utilized for data packets sent between members of various virtual private networks;
  - determining a compression algorithm for messages sent between members of the virtual private network by accessing a portion of the memory that maintains information identifying various compression algorithms to be utilized for data packets sent between members of the various virtual private networks;
  - executing the determined encryption algorithm on at least a payload portion of the data packet;
  - executing the determined compression algorithm on at least the payload portion of the data packet; and
- an output for forwarding the encrypted and compressed data packet to the destination outside the LAN.

18. The virtual private network unit according to claim 17, wherein said circuitry and software compresses the data packet prior to encrypting the data packet.

19. The virtual private network unit according to claim 17, wherein if said circuitry and software determines that the data packet is not being sent between members of the virtual private network, said circuitry and software does send the data pack to the destination.

20. The virtual private network unit according to claim 17, wherein if said circuitry and software determines that the data packet is not being sent between members of the virtual private network, said circuitry and software does not encrypt the data packet.

21. The virtual private network unit according to claim 20, wherein if said circuitry and software determines that the data packet is not being sent between members of the virtual private network, said circuitry and software does not compress the data packet.

22. The virtual private network unit according to claim 17, wherein if said circuitry and software determines that the data packet is not being sent between members of the virtual private network, said circuitry and software does not compress the data packet.

23. The virtual private network unit according to claim 17, wherein said circuitry and software are part of a firewall device.

24. A virtual private network unit for sending a data packet from a source in a local area network (LAN) to a destination outside the LAN comprising:
- an input for receiving a data packet enroute from the source in the LAN to the destination;
- circuitry and software for determining if the source in the LAN and the destination are members of a virtual private network, and if so for:
  - determining an authentication algorithm for messages sent between members of the virtual private network by accessing a portion of a memory that maintains information identifying various authentication algorithms to be utilized for data packets sent between members of various virtual private networks;
  - determining a compression algorithm for messages sent between members of the virtual private network by accessing a portion of the memory that maintains information identifying various compression algorithms to be utilized for data packets sent between members of the various virtual private networks;
  - executing the determined authentication algorithm on at least a payload portion of the data packet;
  - executing the determined compression algorithm on at least the payload portion of the data packet; and
- an output for forwarding the authenticated and compressed data packet to the destination outside the LAN.

25. The virtual private network unit according to claim 24, wherein said circuitry and software compresses the data packet prior to authenticating the data packet.

26. The virtual private network unit according to claim 24, wherein if said circuitry and software determines that the data packet is not being sent between members of the virtual private network, said circuitry and software does send the data pack to the destination.

27. The virtual private network unit according to claim 24, wherein if said circuitry and software determines that the data packet is not being sent between members of the virtual private network, said circuitry and software does not authenticate the data packet.

28. The virtual private network unit according to claim 27, wherein if said circuitry and software determines that the data packet is not being sent between members of the virtual private network, said circuitry and software does not compress the data packet.

29. The virtual private network unit according to claim 24, wherein if said circuitry and software determines that the data packet is not being sent between members of the virtual private network, said circuitry and software does not compress the data packet.

30. The virtual private network unit according to claim 24, wherein said circuitry and software are part of a firewall device.

* * * * *